US012638538B2

(12) United States Patent
Pipher et al.

(10) Patent No.: US 12,638,538 B2
(45) Date of Patent: May 26, 2026

(54) MOBILE PROXIMITY DETECTOR FOR MOBILE ELECTRONIC DEVICES

(71) Applicant: T-Mobile USA, Inc., Bellevue, WA (US)

(72) Inventors: Nicholas Pipher, Parker, CO (US); Kenneth Magoye, Golden, CO (US); Will Tucker, Centennial, CO (US)

(73) Assignee: T-Mobile USA, Inc., Bellevue, WA (US)

( * ) Notice: Subject to any disclaimer, the term of this patent is extended or adjusted under 35 U.S.C. 154(b) by 631 days.

(21) Appl. No.: 17/953,157

(22) Filed: Sep. 26, 2022

(65) Prior Publication Data

US 2023/0009142 A1      Jan. 12, 2023

Related U.S. Application Data

(63) Continuation of application No. 16/914,397, filed on Jun. 28, 2020, now Pat. No. 11,493,586.

(51) Int. Cl.
| | |
|---|---|
| *G01S 1/08* | (2006.01) |
| *G01C 21/36* | (2006.01) |
| *G01S 1/04* | (2006.01) |
| *H04W 4/02* | (2018.01) |

(52) U.S. Cl.
CPC ............ *G01S 1/08* (2013.01); *G01C 21/3667* (2013.01); *G01S 1/047* (2013.01); *H04W 4/023* (2013.01)

(58) Field of Classification Search
None
See application file for complete search history.

(56) References Cited

U.S. PATENT DOCUMENTS

| | | | |
|---|---|---|---|
| 5,926,114 A | 7/1999 | Andrews et al. | |
| 6,115,580 A | 9/2000 | Chuprun et al. | |
| 9,185,639 B1 | 11/2015 | Sherman et al. | |
| 9,672,736 B2 * | 6/2017 | Lovell ................... | G08G 1/164 |
| 9,987,981 B1 | 6/2018 | Deyaf et al. | |
| 10,102,760 B1 | 10/2018 | Foltan et al. | |
| 10,585,440 B1 | 3/2020 | Gariepy et al. | |
| 10,725,139 B1 * | 7/2020 | Duksta .................. | G01S 5/0244 |
| 11,493,586 B2 * | 11/2022 | Pipher ................ | G01C 21/3697 |

(Continued)

FOREIGN PATENT DOCUMENTS

| | | | | | |
|---|---|---|---|---|---|
| CN | 104837200 A | * | 8/2015 | ............ | H04W 24/00 |
| WO | WO-2019055690 A1 | * | 3/2019 | ........... | B64C 39/024 |

*Primary Examiner* — Andrew C Oh
(74) *Attorney, Agent, or Firm* — Lee & Hayes, P.C.

(57) ABSTRACT

A mobile electronic device includes a wireless communications interface configured to receive, from a remote device, a sequence of remote device proximity indicators. The sequence of remote device proximity indicators indicate positions of the remote device. A mobile proximity detector of the mobile electronic device is configured to monitor a current position and a current velocity of the mobile electronic device; determine, from the sequence of remote device proximity indicators, a current remote device position and current remote device velocity; and determine, using at least the current remote device position and velocity, and the current position and the current velocity of the mobile electronic device, a likelihood of close contact between a user of the mobile electronic device and the remote device. A notification manager of the mobile electronic device is configured to notify the user of the likelihood of close contact.

18 Claims, 14 Drawing Sheets

(56)                  References Cited

U.S. PATENT DOCUMENTS

| | | | |
|---|---|---|---|
| 2002/0069019 A1 | 6/2002 | Lin | |
| 2005/0096802 A1 | 5/2005 | Han | |
| 2007/0155489 A1* | 7/2007 | Beckley | G07F 17/3237 |
| | | | 463/29 |
| 2009/0210157 A1 | 8/2009 | Lee et al. | |
| 2010/0256852 A1 | 10/2010 | Mudalige et al. | |
| 2011/0298603 A1* | 12/2011 | King | G08G 1/042 |
| | | | 340/436 |
| 2012/0047087 A1 | 2/2012 | Amidon et al. | |
| 2012/0101711 A1 | 4/2012 | Furmston et al. | |
| 2012/0265433 A1 | 10/2012 | Viola et al. | |
| 2013/0231098 A1 | 9/2013 | Jonas et al. | |
| 2013/0231823 A1 | 9/2013 | Wang et al. | |
| 2014/0089384 A1 | 3/2014 | Diaz et al. | |
| 2015/0066802 A1 | 3/2015 | Goulart et al. | |
| 2015/0149088 A1 | 5/2015 | Attard et al. | |
| 2015/0312721 A1 | 10/2015 | Singh et al. | |
| 2016/0231746 A1 | 8/2016 | Hazelton et al. | |
| 2016/0318445 A1* | 11/2016 | Sugimoto | G06F 3/00 |
| 2017/0013409 A1 | 1/2017 | Cerchio et al. | |
| 2017/0088050 A1 | 3/2017 | Tatsumi et al. | |
| 2017/0111763 A1 | 4/2017 | Morgan et al. | |
| 2017/0116860 A1* | 4/2017 | Tan | G08G 1/163 |
| 2017/0193593 A1* | 7/2017 | Na | G06Q 30/0639 |
| 2017/0195834 A1* | 7/2017 | Na | G01S 5/0249 |
| 2017/0374524 A1* | 12/2017 | Bostick | G08G 1/166 |
| 2018/0029706 A1 | 2/2018 | Baruch et al. | |
| 2018/0173223 A1* | 6/2018 | Doane | G01C 21/20 |
| 2018/0352373 A1 | 12/2018 | Sahadi et al. | |
| 2019/0009776 A1* | 1/2019 | Prakah-Asante | B60W 30/095 |
| 2019/0037518 A1 | 1/2019 | Russell et al. | |
| 2019/0099776 A1 | 4/2019 | Hackenberg et al. | |
| 2019/0364492 A1 | 11/2019 | Azizi et al. | |
| 2019/0385452 A1* | 12/2019 | Nangeroni | G08G 1/202 |
| 2020/0132416 A1 | 4/2020 | Townsend et al. | |
| 2020/0193811 A1 | 6/2020 | Zagajac et al. | |
| 2020/0401641 A1 | 12/2020 | Nurminen et al. | |
| 2021/0269055 A1 | 9/2021 | Kokido et al. | |
| 2021/0366286 A1* | 11/2021 | Kajiwara | B60W 60/00253 |

* cited by examiner

500

502　PROCESSING SYSTEM

504　MEMORY SYSTEM

512

506　COMMUNICATIONS SYSTEM

508　I/O SYSTEM

510　POWER SYSTEM

300

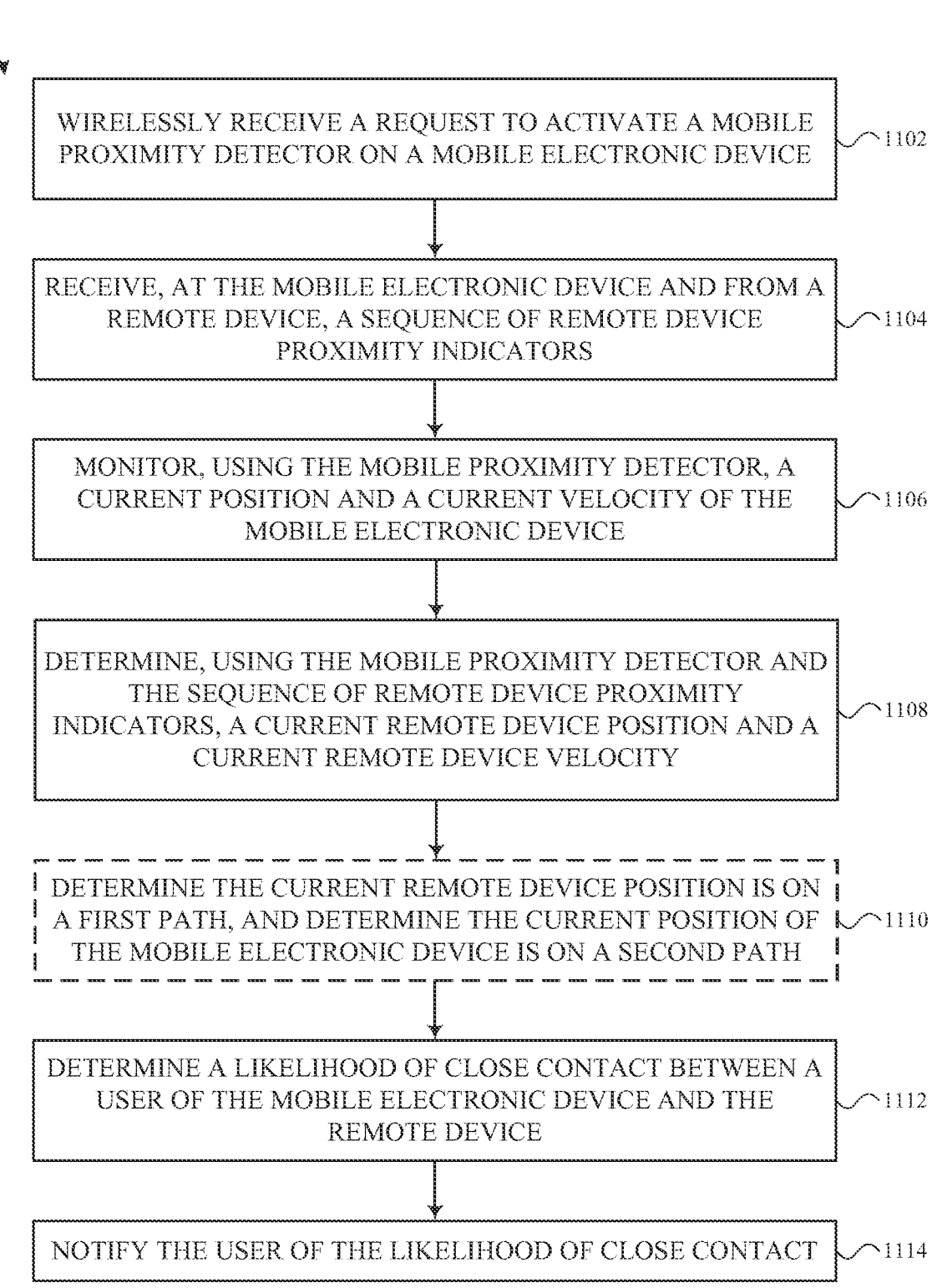

1100

WIRELESSLY RECEIVE A REQUEST TO ACTIVATE A MOBILE PROXIMITY DETECTOR ON A MOBILE ELECTRONIC DEVICE — 1102

RECEIVE, AT THE MOBILE ELECTRONIC DEVICE AND FROM A REMOTE DEVICE, A SEQUENCE OF REMOTE DEVICE PROXIMITY INDICATORS — 1104

MONITOR, USING THE MOBILE PROXIMITY DETECTOR, A CURRENT POSITION AND A CURRENT VELOCITY OF THE MOBILE ELECTRONIC DEVICE — 1106

DETERMINE, USING THE MOBILE PROXIMITY DETECTOR AND THE SEQUENCE OF REMOTE DEVICE PROXIMITY INDICATORS, A CURRENT REMOTE DEVICE POSITION AND A CURRENT REMOTE DEVICE VELOCITY — 1108

DETERMINE THE CURRENT REMOTE DEVICE POSITION IS ON A FIRST PATH, AND DETERMINE THE CURRENT POSITION OF THE MOBILE ELECTRONIC DEVICE IS ON A SECOND PATH — 1110

DETERMINE A LIKELIHOOD OF CLOSE CONTACT BETWEEN A USER OF THE MOBILE ELECTRONIC DEVICE AND THE REMOTE DEVICE — 1112

NOTIFY THE USER OF THE LIKELIHOOD OF CLOSE CONTACT — 1114

FIG. 11

MOBILE PROXIMITY DETECTOR FOR MOBILE ELECTRONIC DEVICES

CROSS-REFERENCE TO RELATED APPLICATION(S)

This application is a continuation patent application of U.S. patent application Ser. No. 16/914,397, filed Jun. 28, 2020 and titled "Mobile Proximity Detector for Mobile Electronic Device," the disclosure of which is hereby incorporated herein by reference in its entirety.

FIELD

Embodiments described herein relate to mobile electronic devices that may be carried, worn, or used by a user and, more particularly, to mobile electronic devices that can be used to determine the positions and velocities of remote devices and their users, which remote devices or their users may come into close contact with the user of the mobile electronic device.

BACKGROUND

Whether going for a run, hiking on a trail, riding a bike, or walking a dog, people are becoming increasingly connected to technology, and more removed from what is going on around them. For example, a person may be wearing a set of headphones and listening to music or a news program, or talking on the phone, while doing any of these and other activities. This can lead to a person having a sudden scare when they are awakened by the reality around them, especially when someone approaches quickly and from behind (e.g., when a mountain biker approaches or passes a hiker from behind). On the flip side, a biker that rings a bell or shouts "passing on the left," without getting a response from someone who is walking their dog, may be annoyed that the dog-walker has tuned the world out. Even when a person is paying attention to their surroundings, they can miss visual and audio cues of those around them, and especially those who may be approaching them from behind or otherwise outside of their peripheral vision. or those who may be approaching them at a fast rate.

SUMMARY

This summary is provided to introduce a selection of concepts, in simplified form, that are further described in other sections. This summary is not intended to identify key features or essential features of the claimed subject matter, nor is it intended to be used as an aid in determining the scope of the claimed subject matter.

Described herein are systems, methods, devices, and apparatus that enable a user of a mobile electronic device to receive notifications from remote devices carried by others in their vicinity. In particular, the user of the mobile electronic device may receive notifications of a likelihood of close contact with a remote device or its user. The notifications may be triggered by a mobile proximity detector of the user's device. The mobile proximity detector may determine the position and velocity of the user's device, and the position and velocity of a remote device, and may use the position and velocity information to determine a likelihood of close contact between the devices or their users. In some cases, the mobile proximity detector may correlate the positions of the devices with path information, which may enable the mobile proximity detector to better determine a likelihood of close contact than when making a determination in free space.

More specifically, a mobile electronic device is described. The mobile electronic device may include a wireless communications interface. The wireless communications interface may be configured to receive, from a remote device, a sequence of remote device proximity indicators. The sequence of remote device proximity indicators may indicate positions of the remote device. A mobile proximity detector of the mobile electronic device may be configured to monitor a current position and a current velocity of the mobile electronic device; determine, from the sequence of remote device proximity indicators, a current remote device position and current remote device velocity; and determine, using at least the current remote device position, the current remote device velocity, and the current position and the current velocity of the mobile electronic device, a likelihood of close contact between a user of the mobile electronic device and the remote device. A notification manager of the mobile electronic device may be configured to notify the user of the likelihood of close contact.

Another mobile electronic device is also disclosed. The mobile electronic device may include a wireless communications system, a processor, and a notification manager. The wireless communications system may be configured to receive, from a remote device, at least one indicator of a first position, a first heading, and a first speed of the remote device. The processor may be configured to determine a second position, a second heading, and a second speed of the mobile electronic device; and determine, using the first and second positions, the first and second headings, and the first and second speeds, a likelihood of close contact between a user of the mobile electronic device and the remote device. The notification manager may be configured to notify the user of the mobile electronic device of the likelihood of close contact.

Also disclosed is a method of notifying a user of a mobile electronic device of a likelihood of close contact between the user and a remote device. The method may include wirelessly receiving, from the user of the mobile electronic device and at the mobile electronic device, a request to activate a mobile proximity detector on the mobile electronic device; receiving, at the mobile electronic device and from the remote device, a sequence of remote device proximity indicators; and monitoring, using the mobile proximity detector, a current position and a current velocity of the mobile electronic device. The method may also include determining, using the mobile proximity detector and the sequence of remote device proximity indicators, a current remote device position and a current remote device velocity; and determining, using the mobile proximity detector and at least the current remote device position, the current remote device velocity, and the current position and the current velocity of the mobile electronic device, the likelihood of close contact between the user and the remote device. The method may also include notifying the user of the likelihood of close contact.

BRIEF DESCRIPTION OF THE DRAWINGS

The disclosure will be readily understood by the following detailed description in conjunction with the accompanying drawings, wherein like reference numerals designate like structural elements.

FIG. 11 shows an example method of notifying a user of a mobile electronic device of a likelihood of close contact between the user and a remote device.

Figure 1:
FIG. 1 shows a first example of a mobile electronic device.
Figure 1:
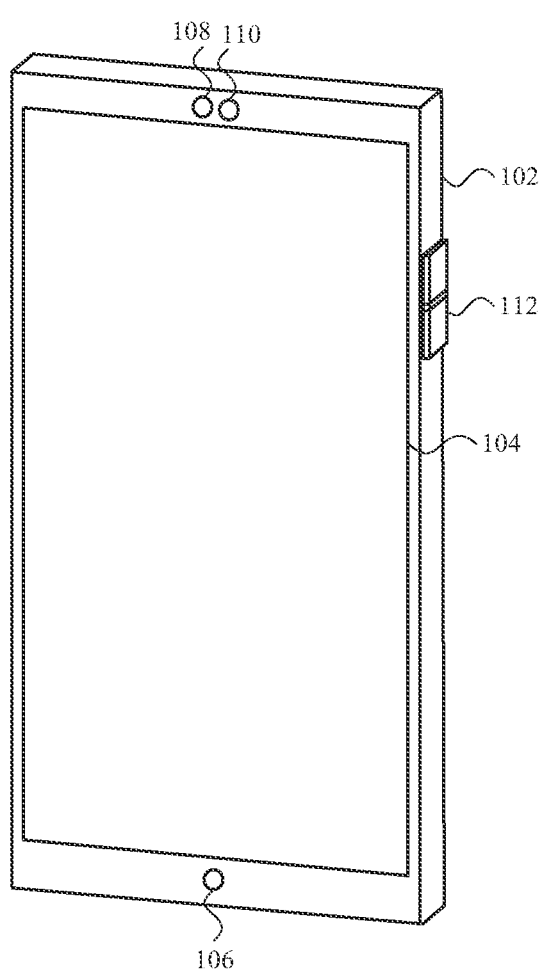

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Reference will now be made in detail to representative embodiments illustrated in the accompanying drawings. It should be understood that the following description is not intended to limit the embodiments to one preferred embodiment. To the contrary, it is intended to cover alternatives, modifications, and equivalents as can be included within the spirit and scope of the described embodiments as defined by the appended claims.

Described herein are systems, methods, devices, and apparatus that enable a user of a mobile electronic device to receive notifications from remote devices carried by others in their vicinity. In particular, the user of the mobile electronic device may receive notifications of a likelihood of close contact with a remote device or its user. The notifications may be triggered by a mobile proximity detector of the user's device. The mobile proximity detector may determine the position and velocity of the user's device. By way of example, the position may be a position with respect to a coordinate system established by the mobile proximity detector, or a geographic location. The mobile proximity detector may also determine the position and velocity of a remote device, and may then use the position and velocity information to determine a likelihood of close contact between the devices or their users. In some cases, the mobile proximity detector may correlate the positions of the devices with path information, which may enable the mobile proximity detector to better determine a likelihood of close contact than when making a determination in free space (e.g., based on whether the devices are on the same or intersecting paths, or on close but non-intersecting paths).

A likelihood of close contact may be based, for example, on a proximity of devices, an estimated time of close contact (or time remaining until close contact), and so on. In some embodiments, a user may be notified of a collection of parameters, such as a time remaining until close contact and a direction of approach of the other user. In some embodiments, a user may not be notified at all unless the direction of approach is from behind or from outside the user's expected peripheral vision. A user's notifications may also be limited to notifications of likelihood of close contact for other devices that are within a proximity detection threshold. In some embodiments, parameters such as a proximity detection threshold, parameters for defining a close contact, types or parameters of notifications, and other parameters may be configurable by a user interface of the user's device.

In some embodiments, a mobile proximity detector may be configurable in different modes, such as a default mode, a tracking mode, or a race mode. In a tracking mode, the mobile proximity detector may receive an identifier of a second device or second user to be tracked and, in addition to or instead of triggering notification when the second user is close or approaching, may trigger notifications when the second user is lagging behind, pulling ahead, or has stopped. In a race mode, the mobile proximity detector may receive an identifier of a second device or second user to be tracked and may trigger notifications when the second user is ahead or behind and, in some cases, how far ahead or behind the second user is with respect to the first user.

FIG. 1 shows a first example of a mobile electronic device 100. By way of example, the device 100 may be a mobile phone (e.g., a smartphone). Alternatively, the device 100 could be any one or more of a tablet computer, a portable music player, a wireless communicator, and so on.

The device 100 may have a frame 102 that supports an electronic display 104. The device 100 may include a microphone 106 and a speaker 108, which may be used for two-way communication with a person who calls, or is called by, a user of the device 100. The device 100 may also include one or more cameras including, for example, a front-facing camera 110 and a rear-facing camera (not shown), and one or more buttons, such as a button 112 along a sidewall of the frame 102.

The electronic display 104 may be a touch-sensitive display, and a user may provide input to the device 100 by touching various locations of the touch-sensitive display, or making gestures or drawing on the touch-sensitive display. The user may also speak commands that are received by the microphone 106, and receive instructions played through the speaker 108.

In some embodiments, the device 100 may be configured to provide haptic feedback to a user (e.g., by vibrating the button 112, the electronic display 104, the frame 102, or some other component of the device 100.

Figure 2:
FIG. 2 shows a second example of a mobile electronic device.
Figure 2:
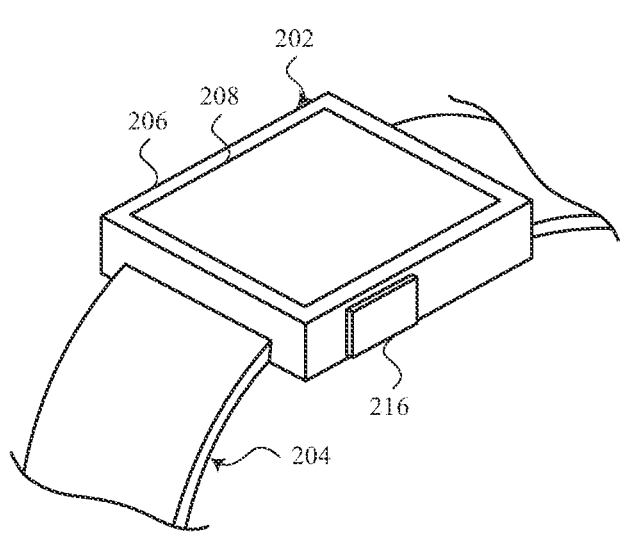

FIG. 2 shows a second example of a mobile electronic device 200. By way of example, the device 200 may be a wearable device. In some cases, the device 200 may be an electronic watch or fitness tracker.

The device 200 may have a body 202 and a band 204. The band 204 may be used to attach the body 202 to a user's wrist. The body 202 may include a frame 206 that supports an electronic display 208. The device 200 may include one or more buttons, such as a button 216 along a sidewall of the frame 206.

The electronic display 208 may be a touch-sensitive display, and a user may provide input to the device 200 by touching various locations of the touch-sensitive display, or making gestures or drawing on the touch-sensitive display. The user may also speak commands that are received by a microphone of the device 200, and receive instructions played through a speaker of the device 200.

In some embodiments, the device 200 may be configured to provide haptic feedback to a user (e.g., by vibrating the button 216, the electronic display 208, the frame 206, or some other component of the device 200.

Figure 3:
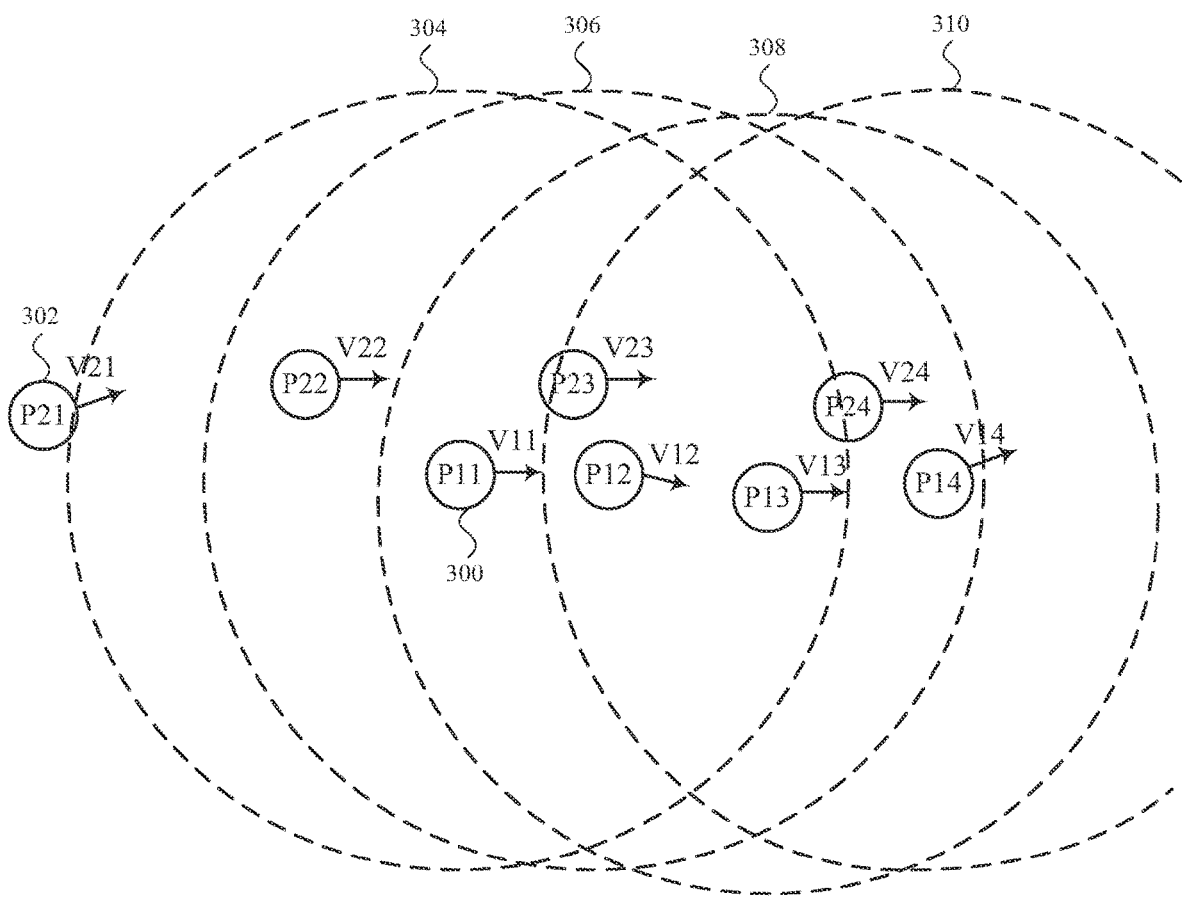
FIG. 3 shows a plan (or map) view of sequences of positions of first and second mobile electronic devices.

FIG. 3 shows a plan (or map) view of sequences of positions of first and second mobile electronic devices 300, 302. Each of the devices 300, 302 may be one of the mobile electronic devices described with reference to FIG. 1 or 2, or another type of mobile electronic device. For ease of description, the first device 300 will be referred to as the mobile electronic device of a first user, and the second device 302 will be referred to as the mobile electronic device of a second user. The second device 302 may also be referred to, at times, as a remote device (i.e., a device that is remote from the first user).

Each of the devices 300, 302 may have a wireless communications system including one or more wireless communications interfaces. The wireless communications interface(s) may be variously configured to communicate using a 3rd Generation Partnership Project (3GPP) Long Term Evolution (LTE) communications protocol (e.g., 4G, 5G, and so on), Wi-Fi communications protocol (e.g., an Institute of Electrical and Electronics Engineers (IEEE) 802.11 communications protocol), short-range wireless communications protocol (e.g., a BLUETOOTH® communications protocol (e.g., a BLUETOOTH® or BLUETOOTH® Low Energy (BLE) communications protocol), and so on), and/or another radio frequency (RF) communications protocol. In some cases, the devices 300, 302 may communicate with each other using any of the above or other communications protocols. In some cases, a user of the first device 300 may know the user of the second device 302 (or vice versa) and may initiate communication between the devices 300, 302. In some cases, a mobile network operator with which the first and second devices 300, 302 have subscriptions may proactively facilitate communication between the devices 300, 302. For example, the mobile network operator may enable one or more communication channels between the devices 300, 302 after determining that the devices 300, 302 are within a defined proximity detection threshold of each other. In some cases, the first device 300 may discover the second device 302 (or vice versa) by means of a beacon or other form of communications. For example, the second device 302 may transmit a beacon communication. The beacon communication may be transmitted in an omnidirectional or directional (e.g., beam-formed) manner.

Each of the devices 300, 302 may also have a processor, and at least one of the devices 300, 302 may include a mobile proximity detector, which mobile proximity detector may be partially or wholly operated or instantiated by a processor of the device. A mobile proximity detector may be used to determine a likelihood of close contact between the first and second users (or equivalently, between the devices 300, 302, or between a user of one of the devices and the other device). The likelihood of close contact may be used to determine whether a user of a device should be notified. The likelihood of close contact may be based, for example, on a proximity of the devices 300, 302, an estimated time of close contact (or time remaining until close contact) between the devices 300, 302, and so on.

As shown, the first device 300 may have a current position (P11) and a current velocity (V11; i.e., a current speed and a current heading) at an arbitrary time, T1. The first device 300 may subsequently move to other positions (e.g., P12, P13, and P14) at respective times of T2, T3, and T4, and may have a velocity that stays the same or varies at each of the other positions (e.g., velocities V12, V13, and V14). The positions P11, P12, P13, and P14 may be referred to herein as a first sequence of positions for the first device 300. Similarly, the second device 302 may have a current position (P21) and a current velocity (V21; i.e., a current speed and a current heading) at or about the time T1. The second device 302 may subsequently move to other positions (e.g., P22, P23, and P24) at or about times T2, T3, and T4 respectively, and may have a velocity that stays the same or varies at each of the other positions (e.g., velocities V22, V23, and V24). The positions P21, P22, P23, and P24 may be referred to herein as a second sequence of positions for the second device 302.

At time T1, the devices 300, 302 are headed somewhat away from each other and it does not appear that they will come into close contact (e.g., pass within a proximity detection threshold of each other or collide). However, at times T2-T4, it appears that the devices 300, 302 may ultimately come into close contact with each other. It may therefore be useful to notify the users of the devices 300, 302 that they will come into close contact, or notify at least the user who is projected to arrive at the presumed point of close contact first (e.g., the user who is holding or using the device that is ahead of the other device). A user may also be notified about a time of close contact, a time remaining until close contact, a location of close contact, a direction of approach of the other user or device (e.g., from behind, from the left, from the right, or from in front), or a velocity of the other user or device. In some cases, such notifications may be triggered by a mobile proximity detector of a user's device.

A likelihood of close contact, direction of approach, or determination of whether a user is ahead or behind another user may be made by determining an orientation of one or both of two users. An orientation of a user may be determined based on their current velocity or heading.

In some cases, a device may not be notified of a likelihood of close contact with another device (or its user) until the other device is within a proximity detection threshold of the device. For example, FIG. 3 shows a sequence of proximity detection thresholds 304, 306, 308, 310 for the first device 300, at respective positions P11, P12, P13, and P14 of the first device 300. At position P11 of the first device 300, the second device 302 is outside of the proximity detection threshold 304 set for the first device 300. As a result, a user of the first device 300 may not be notified of a likelihood of close contact with the second device 302 or its user. However, at each of positions P12, P13, and P14, the second device 302 is within the first device's proximity detection threshold (i.e., proximity detection threshold 306, 308, or 310) and, as a result, the user of the first device 300 may be notified if there is a likelihood of close contact with the second device 302 or its user.

Figure 4A:
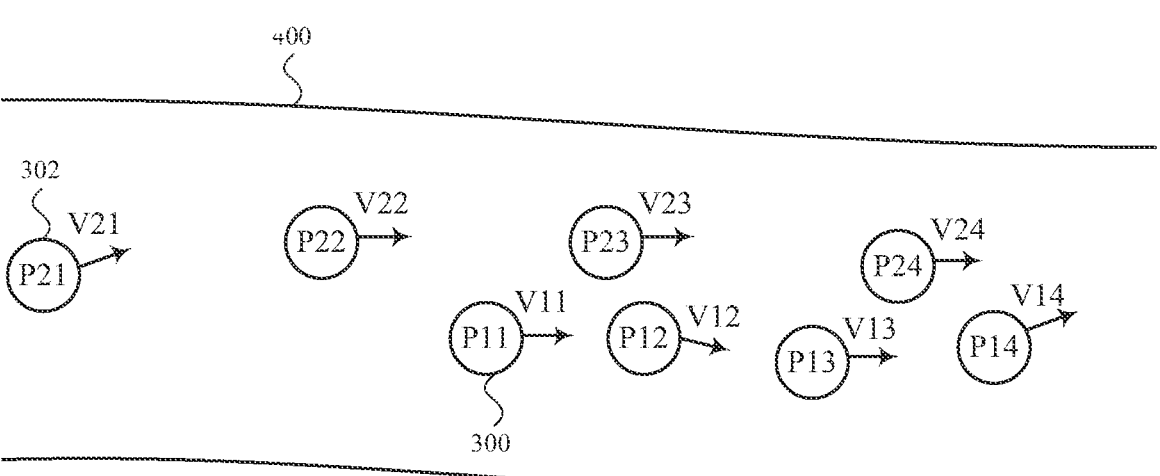
FIG. 4A shows a scenario in which the positions of the first and second mobile electronic devices are on a same path.
Figure 4B:
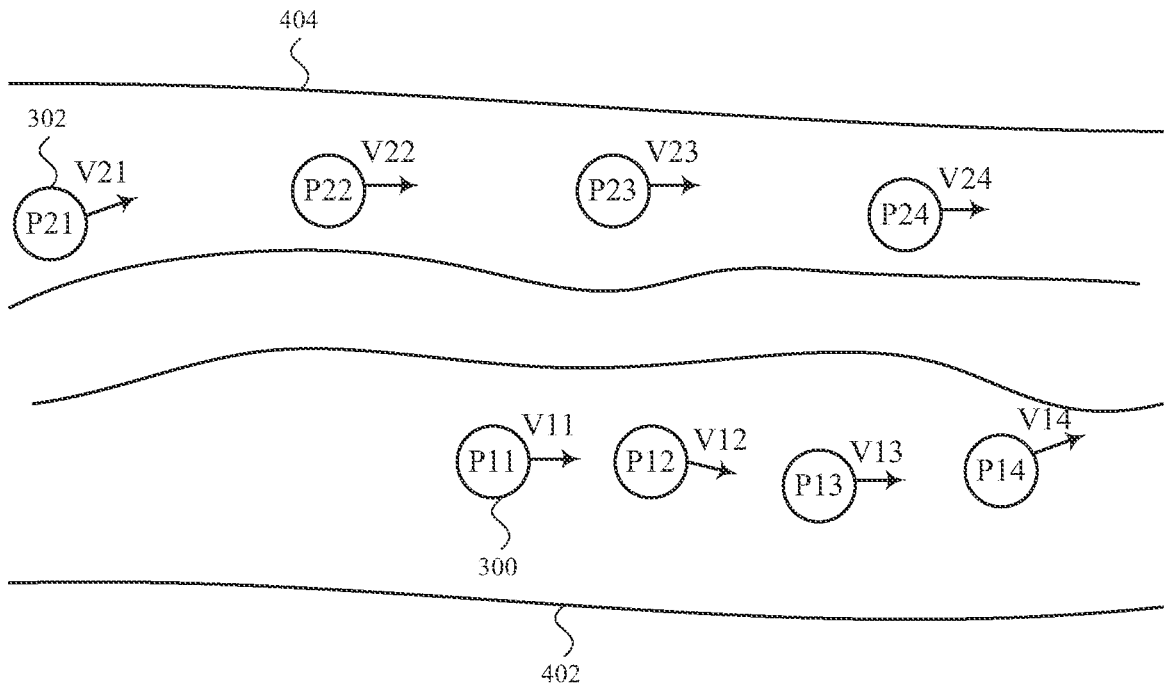
FIG. 4B shows a scenario in which the positions of the first and second mobile electronic devices are on different, non-intersecting paths.
Figure 4C:
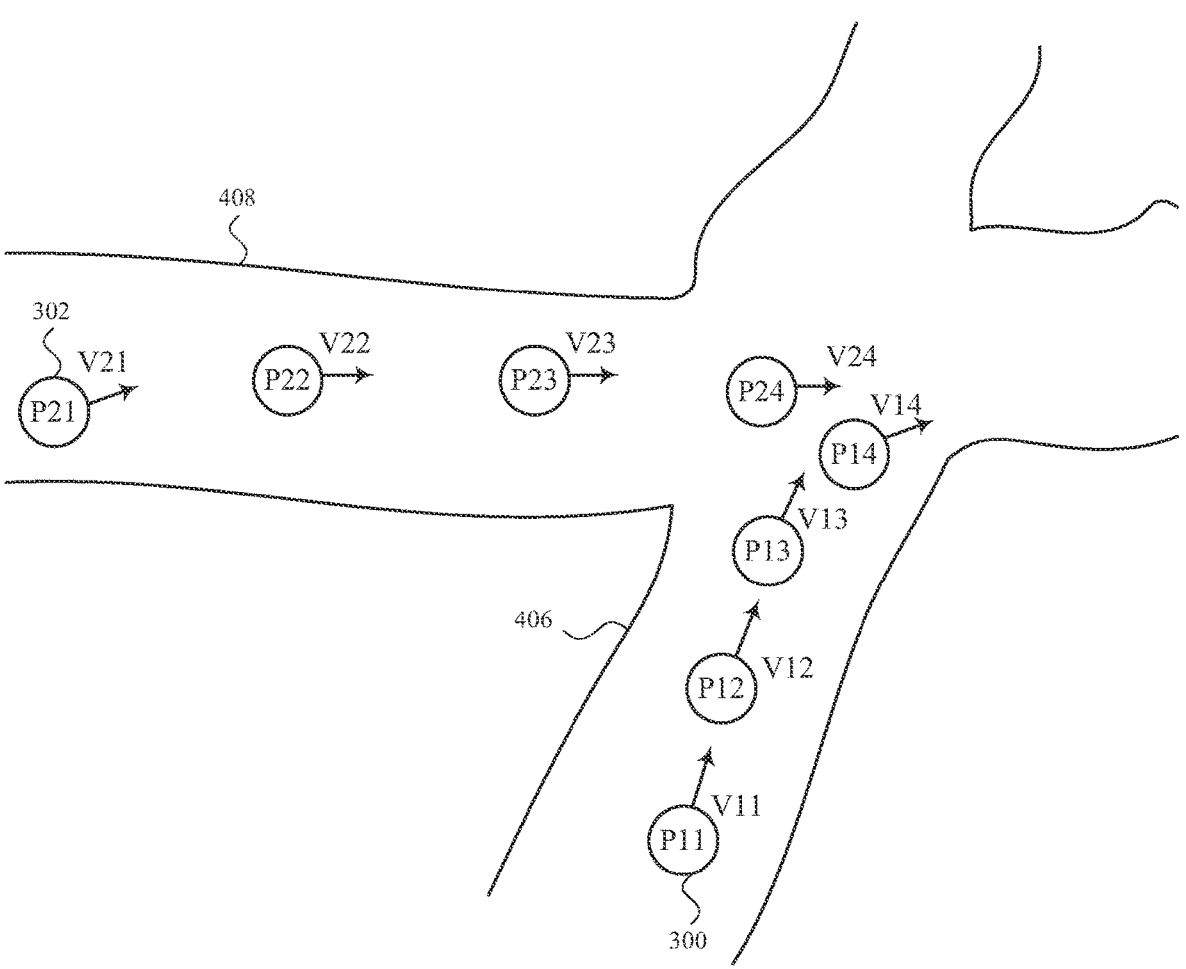
FIG. 4C shows a scenario in which the positions of the first and second mobile electronic devices are on respective, different, and intersecting paths.

FIGS. 4A-4C show additional plan (or map) views of sequences of positions of the first and second mobile electronic devices 300, 302. However, in contrast to the plan view described with reference to FIG. 3, the plan views shown in FIGS. 4A-4C show the positions of the devices 300, 302 with respect to one or more paths. Path information can improve a mobile proximity detector's accuracy in determining a likelihood of close contact between first and second users of first and second devices 300, 302 (e.g., by constraining the likely movements of one or both of the users to one or more paths).

FIG. 4A shows a scenario in which the positions of the first and second devices 300, 302 are on a same path 400. If there are no opportunities to exit the path (e.g., within a section of the path 400 of interest), the likelihood of close contact between the users of the first and second devices 300, 302 depends on the velocities of their devices 300, 302. Even if there are one or more opportunities to exit the path, a likelihood of close contact can be determined with somewhat greater certainty than if the positions of the devices 300, 302 are plotted in free space, as shown in FIG. 3. The correlation of the positions of the devices 300, 302 to the path 400 also makes it easier to determine which of the device users is ahead of the other. For example, it can be determined that the user of the first device 300 is ahead of the user of the second device 302 (with reference to a general direction of travel of the first and second devices 300, 302). Path information may also assist a mobile proximity detector in determining, with greater certainty, a time of close contact (or time remaining until close contact) between the users of the device 300, 302, a location of close contact, a direction of approach of the user that is behind the other user, or a velocity of the user that is behind the other user.

In some embodiments, a mobile proximity detector may only notify a user of its device that a likelihood of close contact exists when the other user is approaching from behind, or from outside the user's expected range of peripheral vision. Thus, the user of the first device 300 may receive notifications in the scenario shown in FIG. 4A, but the user of the second device 302 may not receive notifications.

When the users of the first and second devices 300, 302 are unrelated users, a mobile proximity detector of one of the devices may only provide notifications to its user when the likelihood of close contact is greater than a threshold likelihood of close contact, or when the devices 300, 302 are within a proximity detection threshold, and/or when a determined time of close contact (or time remaining until close contact) is less than a threshold amount of time. This can limit a user from being overwhelmed by a large number of notifications, such that the notifications become annoying or meaningless.

When the users of the first and second devices 300, 302 are related users, a mobile proximity detector of one of the devices may provide notifications to its user under the same conditions as when the users are unrelated, but in response to a different likelihood of close contact, proximity detection threshold, or threshold amount of time to close contact. The different thresholds may be based on an assumption that two related users are intentionally traveling with each other in closer proximity. Alternatively or in addition, when the users of the devices 300, 302 are related, they may be notified when they become too distant from one another. For example, a user that is ahead of the other may be notified when the other user falls outside of a proximity detection threshold or a time to close contact threshold. The latter notification may signify that the leading user needs to wait for the trailing user to catch up.

If the first and second devices 300, 302 were alternatively moving away from each other along the path 400, the path information can be used to determine, with more certainty, that the likelihood of close contact between the devices 300, 302 is low, given the constraints of the path 400.

If the first and second devices 300, 302 were alternatively moving toward each other along the path 400, the path information can be used to determine, with more certainty, that the likelihood of close contact between the devices 300, 302 is high, given the constraints of the path 400 and there not being a possibility that the devices 300, 302 are moving along close but separate paths.

FIG. 4B shows a scenario in which the positions of the first and second devices 300, 302 are on different, non-intersecting paths 402, 404. If there are no opportunities to change paths (e.g., within sections of the paths 402, 404 of interest), there is no likelihood of close contact between the users of the first and second devices 300, 302. Here, the path information enables a very different likelihood of close contact determination (i.e., no likelihood) than in the free space scenario described with reference to FIG. 3.

FIG. 4C shows a scenario in which the positions of the first and second devices 300, 302 are on respective, different, and intersecting paths 406, 408. By way of example, the paths 406, 408 are shown to cross each other at their point of intersection, but intersecting paths may alternatively merge at their point of intersection. In this scenario, the likelihood of close contact between the users of the first and second devices 300, 302 depends on the velocities of their devices 300, 302. As a result of the path information, a mobile proximity detector of one of the devices 300, 302 may determine a likelihood of close contact with greater certainty than if the positions of the devices 300, 302 are plotted in free space, as shown in FIG. 3. For example, the mobile proximity detector may determine an actual length of each path to the point of intersection, whereas in free space, a shorter (and incorrect) distance from a device position to a point of intersection of two velocity vectors of the devices 300, 302 may be presumed. The path information may also assist a mobile proximity detector in determining, with greater certainty, a time of close contact (or time remaining until close contact) between the users of the devices 300, 302, a location of close contact, a direction of approach of one user with respect to the other user, or a velocity of the other user.

Figure 5A:
FIG. 5A shows an example block diagram of a mobile electronic device.
Figure 5A:
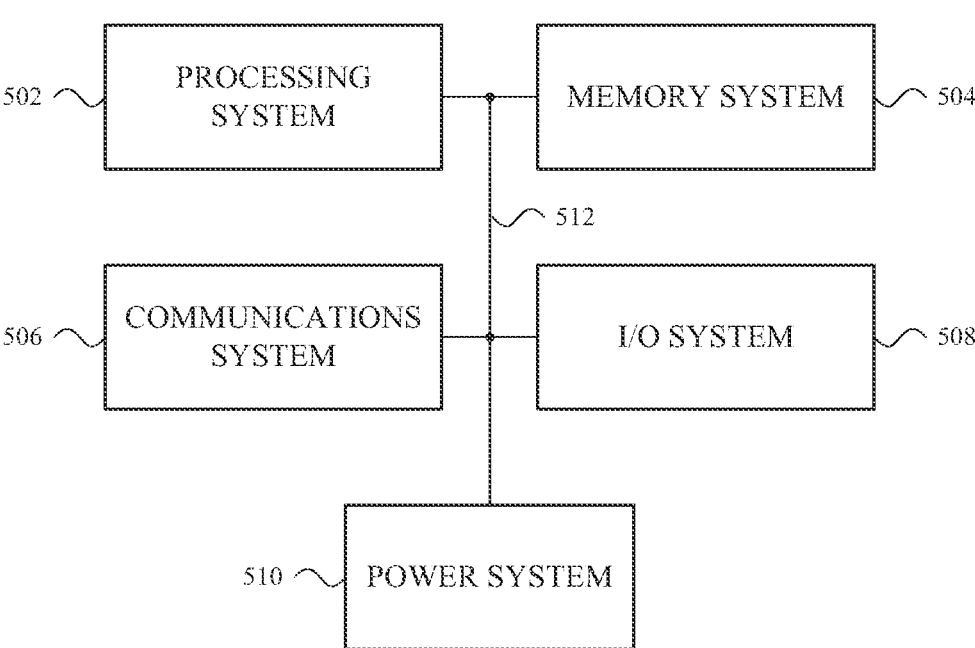

FIG. 5A shows an example block diagram 500 of a mobile electronic device. In some cases, the mobile electronic device may be the mobile electronic device described with reference to FIG. 1 or 2. The mobile electronic device may include, for example, a processing system 502, a memory system 504, a communications system 506, an input/output (I/O) system 508, and a power system 510. The processing system 502, memory system 504, communications system 506, I/O system 508, and power system 510 may be connected, or may communicate with each other, using one or more buses 512.

The processing system 502 may include one or more processors or controllers. For example, the processing system 502 may include one or more of a microprocessor, microcontroller, application-specific integrated circuit (ASIC), field-programmable gate array (FPGA), peripheral interface controller (PIC), and so on. The processing system may be a discrete system including an integrated circuit or System-on-Chip (SoC), or a distributed system including multiple integrated or discrete circuits. For example, the processing system 502 may in some cases include different processors or controllers that are responsible for different functions or tasks.

The memory system 504 may store information (e.g., instructions and data) that may be accessed or consumed by the processing system 502, received or transmitted from/to other devices via the communications system 506, or received or output from/to the I/O system 508. Instructions retrieved and executed by the processing system 502 may transform the processing system 502 into a special-purpose computing system.

The communications system 506 may include wired and/ or wireless communications interfaces. In some embodiments, the communications system 506 may include one or more of a cellular radio communications interface (e.g., a 3GPP LTE communications interface), a Wi-Fi communications interface, or a short-range wireless communications interface (e.g., a BLUETOOTH® communications interface). Information received using the communications system 506 may be stored by the memory system 504 or provided directly to the processing system 502 or I/O system 508. Information may likewise be transmitted to other devices using the communications system 506.

The I/O system 508 may include one or more input devices, such as a touch screen, buttons, a dial or crown, a camera, a microphone, a global positioning system (GPS), and/or various sensors (e.g., touch sensors, force sensors, temperature sensors, biometric sensors, capacitive sensors, optical sensors, resistive sensors, and/or proximity sensors), and so on. The I/O system 508 may also include one or more output devices, such as an electronic display, a speaker, a light source for providing flood or spot illumination, a haptic output device (e.g., a vibratory, electrostatic, magnetic, or other type of haptic output device), and so on.

The power system 510 may include one or more batteries, an electrical power port, a magnetic battery charging interface, and so on. The power system 510 may provide power to the other systems, and in some cases may be controlled via the other systems.

Figure 5B:
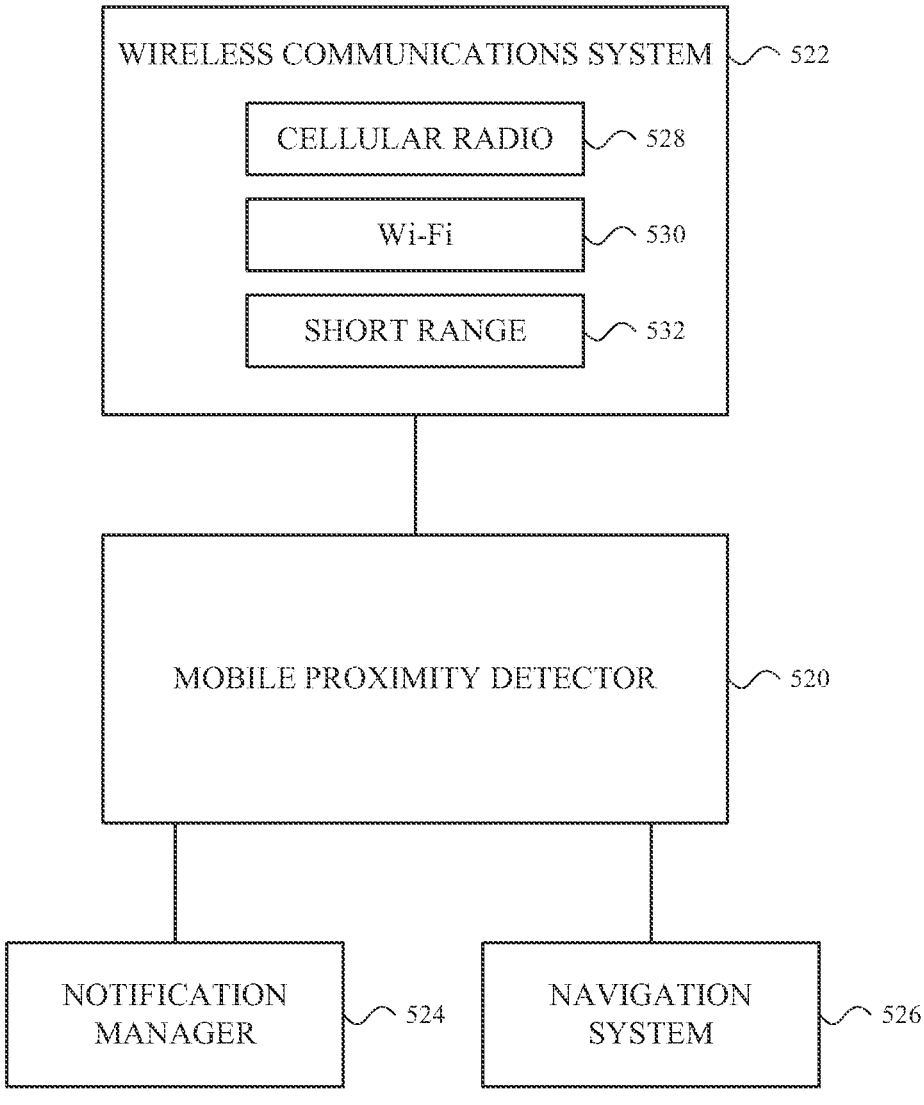
FIG. 5B shows an example block diagram of a mobile proximity detector of a mobile electronic device.

FIG. 5B shows an example block diagram of a mobile proximity detector 520 of a mobile electronic device. Also shown in FIG. 5B are a wireless communications system 522, a notification manager 524, and an optional navigation system 526 with which the mobile proximity detector 520 communicates. The mobile proximity detector 520 and notification manager 524 may be implemented using an integrated circuit, such as an integrated circuit of the processor described with reference to FIG. 5A. Alternatively, the mobile proximity detector 520 and notification manager 524 may be implemented by a collection of discrete circuits, or by one or more systems including integrated circuits and discrete circuits, and so on. In some embodiments, a processing system (or processor) including one or more integrated circuits may execute a set of instructions or code segments that causes the mobile proximity detector 520 or notification manager 524 to perform their various functions. The wireless communications system 522 may also include one or more integrated circuits or discrete circuits, and may be more or less integrated with the mobile proximity detector 520 and/or notification manager 524.

The wireless communications system 522 may include one or more wireless communications interfaces, including, for example, a cellular radio communications interface 528 (e.g., a 3GPP LTE communications interface), a Wi-Fi communications interface 530, and/or a short-range wireless communications interface 532 (e.g., a BLUETOOTH® communications interface). The wireless communications system 522 (e.g., one of the wireless communications interfaces 528, 530, 532) may be configured to receive, from a remote device (e.g., a device of another user), at least one indicator of a proximity, position, heading, and/or speed of the remote device. In some cases, the indicator(s) may include one or more positions, headings, and/or speeds of the remote device. In some cases, the indicator(s) may include one or more positions and/or velocities of the remote device. Depending on a device's configuration, the indicator(s) may be received over one or more of the cellular radio communications interface 528, the Wi-Fi communications interface 530, and/or the short-range wireless communications interface 532.

In some embodiments, the remote device may periodically broadcast one or more of a position, velocity, heading, or speed of the remote device. Some or all of this information may broadcast in a sequence of beacons. In some embodiments, the mobile proximity detector 520 may cause an information query to be transmitted via one or more of the wireless communications interfaces 528, 530, 532 of the wireless communications system 522, and the remote device may transmit, in response to the information query, one or more of a position, velocity, heading, or speed of the remote device. The mobile proximity detector 520 may transmit the information query to the remote device, or may broadcast the information query to all nearby devices.

In some cases, the indicator(s) may include a sequence of remote device proximity indicators, received over time (e.g., indicators that are updated over time). Each remote device proximity indicator may indicate a current position of the remote device, explicitly or implicitly. For example, a remote device proximity indicator may explicitly include a position of the remote device, and the mobile proximity detector 520 may determine a current remote device position of the remote device directly from a current remote device proximity indicator (e.g., by extracting the position from the indicator). The mobile proximity detector 520 may then determine a current remote device velocity, for example, by determining a distance between two remote device positions and dividing the distance by a difference between the times at which two remote device proximity indicators including the positions were received (or a difference between two time stamps included in the remote device proximity indicators).

Additionally or alternatively, the wireless communications system 522 may receive the sequence of remote device proximity indicators in a sequence of beacons and/or a sequence of beamformed communications. In some cases, the beacons or beamformed communications may identify the remote device but contain little or no information about the remote device's position or movement. In these cases, the mobile proximity detector 520 may determine, from a beacon or beamformed communication, a signal strength of the beacon or beamformed communication. The mobile proximity detector 520 may then determine, from a sequence of signal strengths, a sequence of positions (or at least relative positions) of the remote device and, in some cases, a sequence of velocities of the remote device (e.g., for example, by estimating changes in positions based on changes in signal strengths).

When the sequence of remote device proximity indicators is received in a sequence of beamformed communications, the mobile proximity detector 520 may also or alternatively determine a direction of reception for each beamformed communication and/or a change in a direction of reception for the sequence of beamformed communications, which may be used to determine a direction from a current position of the mobile electronic device (i.e., the device that includes the mobile proximity detector 520) to a current position of the remote device. Being able to determine the direction from the current position of the mobile electronic device to the current position of the remote device can improve position and velocity determinations made by the mobile proximity detector 520.

Contemporaneously with the wireless communications system 522 receiving the sequence of remote device proximity indicators, the mobile proximity detector 520 may monitor a current position and current velocity (or current position, current heading, and current speed) of the mobile electronic device that includes the mobile proximity detector 520 (i.e., the mobile proximity detector 520 may update the device's current position and current velocity over time). In some cases, a sequence of positions of the mobile electronic device may be received from the navigation system 526 (e.g., a global positioning system (GPS), or a system that determines a position of the mobile electronic device by triangulation from cell tower positions). The velocity (or heading and speed) may be determined similarly to how velocity (or heading and speed) are determined for the remote device, or from accelerometer data, compass data, GPS data, or other sensor data.

The mobile proximity detector 520 may further determine, using at least the current remote device position and current remote device velocity (or current remote device heading and speed), and the current position and current velocity of the mobile electronic device, a likelihood of close contact between a user of the mobile electronic device and the remote device.

In some embodiments, the mobile proximity detector 520 may further determine a time of close contact (or time remaining until close contact) between the user of the mobile electronic device and the remote device.

In some embodiments, the mobile proximity detector 520 may determine a direction of approach of the remote device with respect to the mobile electronic device. For example, the mobile proximity detector 520 may use at least the determined current remote device position and current remote device velocity, and the current position and velocity of the mobile electronic device, to determine a direction of approach of the remote device with respect to the mobile electronic device.

In some embodiments, the navigation system 526 may be configured to determine the current remote device position is on a first path, and determine the current position of the mobile electronic device is on a second path (e.g., as described with reference to any of FIGS. 4A-4C). In these embodiments, the mobile proximity detector 520 may be configured to further determine the likelihood of close contact between the user and the remote device using a map of the first and second paths. For example, the mobile proximity detector 520 may determine the likelihood of close contact in response to determining whether the first and second paths are the same path, intersecting paths, or non-intersecting paths. Such a determination may yield a different result than determining a likelihood of close contact in free space (i.e., absent path information). Path information may also be used to determine a time of close contact, a time remaining until close contact, a direction of approach, and/or a velocity of the other user. Path information (e.g., a map of the first and second paths) can also be used, in combination with the positions and velocities (or headings) of the devices, to determine which of the devices is ahead of the other.

In some embodiments, the current position and current velocity of the first device, in combination with the position of the second device, may be used by the mobile proximity detector 520 to determine whether the second device is behind, to the side of, or in front of the user of the first device, or inside or outside the first device user's expected range of peripheral vision. When combined with path information and the velocity or heading of the second device, a direction of approach of the second user can be determined (when applicable).

The notification manager 524 may be configured to notify a user of one of the devices of a likelihood of close contact with the other device (or a user of the other device), as determined by the mobile proximity detector 520. The notification may take the form of an audible notification, an optical notification (e.g., activation of a screen, or an icon or image on the screen), a haptic notification (e.g., a vibration or tap), and/or an electrical or electrostatic notification. In the case of an audible notification, the notification may be provided directly via the device initiating the notification, or via an accessory device, such as a set of wearable audio devices or earphones. In the case of an optical notification, the notification may in some cases be provided as part of a heads-up display, such as a heads-up display of the device initiating the notification, or a heads-up display of an accessory device, such as a set of glasses or a helmet. In some cases, a notification may be provided in multiple ways. Notifications may also be provided on an augmented reality display. A display may be used to display information only, or in some cases may be used to display representations of approaching devices or a map of approaching devices.

When there is a change in the likelihood of close contact, the notification manager 524 may provide another notification having the same properties or type as a prior notification, or the notification manager 524 may change a property or type of notification used to notify the user of the likelihood of close contact. For example, as a remote device gets closer or the likelihood of close contact with the remote device increases, a louder, brighter, more forceful, stronger, or otherwise different or more intense notification may be provided. Additionally or alternatively, the type of notification may be changed, or the number of types of notifications may be increased (e.g., optical and haptic notifications, or audible and haptic notifications, instead of just haptic notifications). In the case of audible or haptic notifications, a vibration pattern or tone may change as a likelihood of contact becomes more certain (or, for example, as a remote device gets closer or speeds up). In some cases, a notification may be provided in different ways to signal a remote device's direction of approach. For example, a tone may be played in a user's left earbud (e.g., solely in the user's left earbud) when a remote device is approaching from the left and poses a likelihood of contact, or in the user's right earbud (e.g., solely in the user's right earbud) when a remote device is approaching from the right and poses a likelihood of contact, or in both earbuds when a remote device is approaching from behind, with the tone(s) getting louder or more closely spaced in time as the remote device gets closer (e.g., similar to how a driver might be notified of an obstruction when backing up their vehicle). As another example, a haptic device may be configured to vibrate or pulse in accord with different patterns, or for different lengths of time, to indicate different directions of approach of a remote device. Subsequent vibrations or pulses may be provided at shorter time intervals, or with greater intensity, as the remote device gets closer. In some cases, notifications may be adjusted for a user's deficits. For example, someone with vision impairment may program their notification manager to provide audible or haptic notifications, and someone who is deaf may program their notification manager 524 to provide haptic notifications. In some cases, different types of notifications may be programmed by a user (e.g., through the user interface described with reference to FIG. 10). In some cases, the notification manager 524 may only change the property or type of notification in response to a threshold amount of change in the likelihood of close contact.

The notification manager 524 may also notify a user of a determined time of close contact, a time remaining until close contact, a direction of approach of a remote device, or a velocity of a remote device. For example, the notification manager 524 may cause the time of close contact, time remaining until close contact, direction of approach, and/or velocity to be spoken to the user. Additionally or alternatively, the notification manager 524 may cause the time of close contact, time remaining until close contact, direction of approach, and/or velocity to be displayed on a screen, such as a screen of a mobile phone, wearable device (e.g., an electronic watch or fitness tracker), or heads-up display. In some cases, the notification manager 524 may change a property or type of notification used to notify the user of the time of close contact or direction of approach (e.g., in response to a change in the time of close contact, direction of approach, and/or velocity). For example, as the time of close contact gets closer or the direction of approach moves to behind (or more to the behind) of the user, a louder, brighter, more forceful, or stronger notification may be provided. Additionally or alternatively, the type of notification may be changed, or the number of types of notifications may be increased (e.g., optical and haptic notifications, or audible and haptic notifications, instead of just haptic notifications). In some cases, the notification manager 524 may only change the property or type of notification in response to a threshold amount of change in the time of close contact, time remaining until close contact, direction of approach, or velocity.

In some embodiments, the notification manager 524 may provide notifications in response to the mobile proximity detector's evaluation of a collection of parameters, such as likelihood of close contact, time of close contact, time remaining until close contact, direction of approach, and/or velocity. For example, the notification manager 524 may only notify a user of a likelihood of close contact when the direction of approach is from behind (and/or to the side, or outside the user's expected range of peripheral vision). As another example, the notification manager 524 may notify the user of a likelihood of close contact by notifying the user of the time of close contact. As another example, the notification manager 524 may notify the user of a likelihood of close contact and a direction of approach, or of the time of close contact (or time remaining until close contact) and direction of approach, together.

Figure 6:
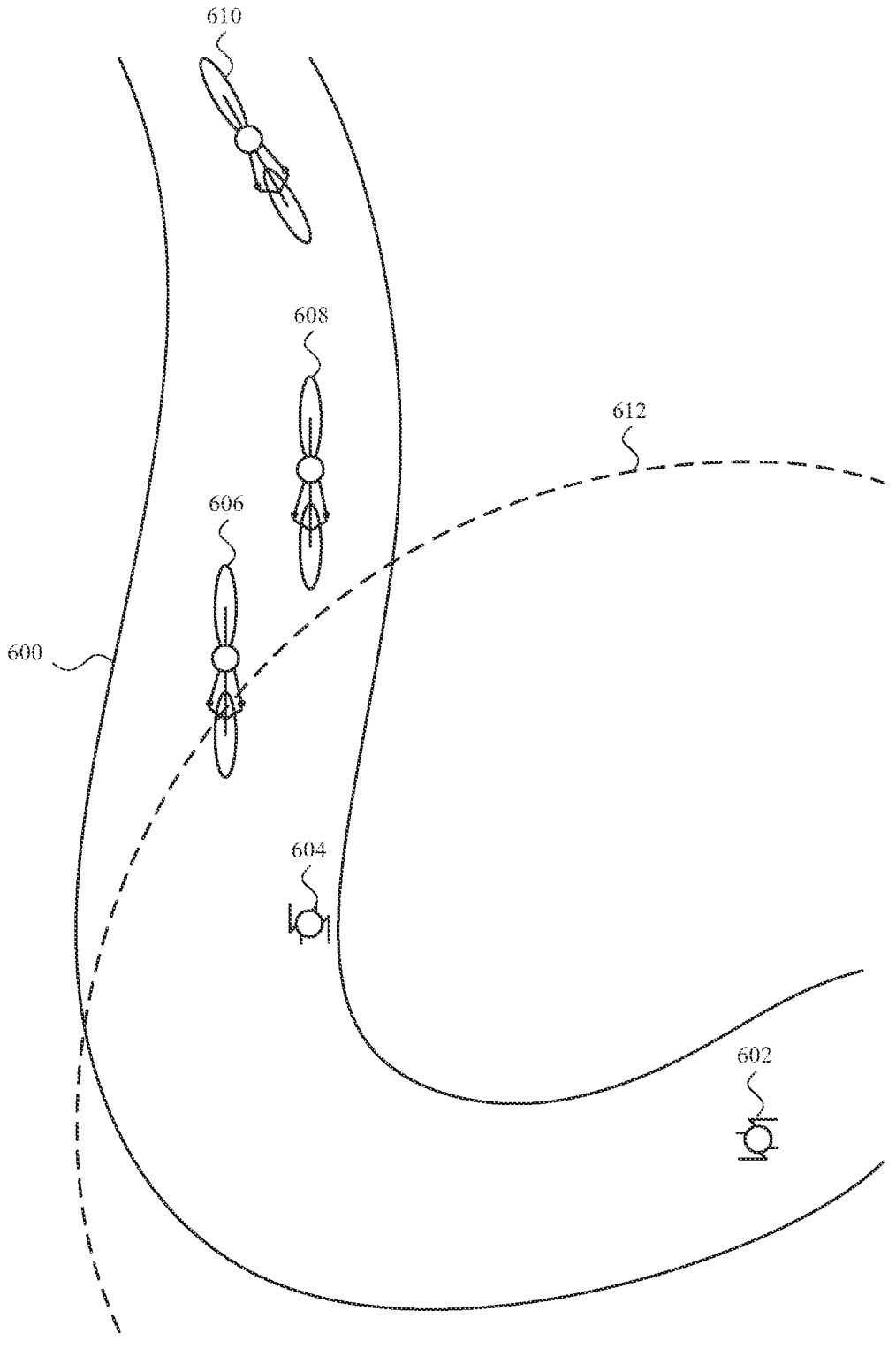
FIG. 6 shows a first example use of a mobile electronic device having a mobile proximity detector, by a jogger on a trail.

FIGS. 6-9 show various example use cases for the mobile proximity detector described herein. In particular, FIG. 6 shows a first example use of a mobile electronic device having a mobile proximity detector, by a jogger 602 on a trail 600. Other joggers 604, bikers 606, 608, 610, walkers, drivers, and so on may also use the trail. In alternative embodiments, the jogger 602 may alternatively be a biker, walker, driver, and so on. Also in alternative embodiments, the trail 600 may be a road or other defined path.

The jogger 602 may be carrying or wearing a mobile electronic device having a mobile proximity detector. By way of example, the jogger 602 may be wearing a set of wearable audio devices or otherwise not listening for other users of the trail 600. A group of three mountain bikers 606, 608, 610 may be approaching the jogger 602 fast, from a direction of approach that is behind the jogger 602. In this scenario, the mobile proximity detector may determine when the three mountain bikers 606, 608, 610 move within a threshold proximity 612 of the jogger 602 and notify the jogger 602 of a likelihood of close contact, from a particular direction of approach, at a particular time (i.e., at a time of close contact), and/or at a particular velocity (e.g., 21 mph, or "fast"). In this manner, the jogger 602 is not startled as the three mountain bikers 606, 608, 610 pass, and the three mountain bikers 606, 608, 610 are not annoyed when the jogger 602 fails to hear them yell. The mobile proximity detector may notify the user of the three mountain bikers 606, 608, 610 as a group, given their close proximity to one another and similar velocities, or the mobile proximity detector may notify the user of each of the three mountain bikers 606, 608, 610 individually.

Figure 7:
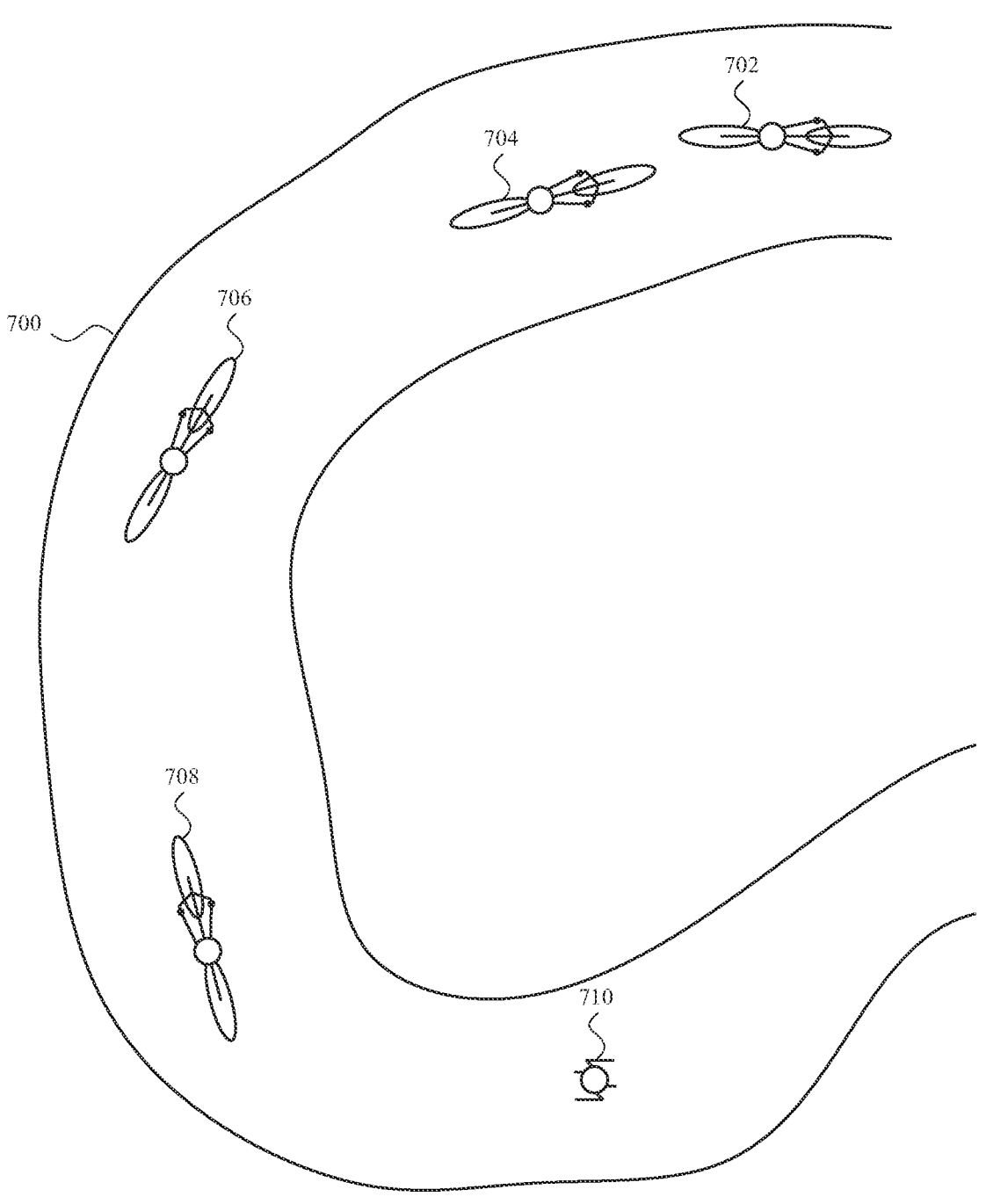
FIG. 7 shows a second example use of a mobile electronic device having a mobile proximity detector, by a biker on a trail.

FIG. 7 shows a second example use of a mobile electronic device having a mobile proximity detector, by a biker 702 on a trail 700. The biker 702 may be a first biker, who may be riding with a second biker 704 (and possibly other bikers 706, 708) they know. Other bikers, joggers 710, walkers, drivers, and so on may also use the trail 700. In alternative embodiments, each of the first and second bikers 702, 704 may alternatively be a jogger, walker, driver, and so on.

The biker 702 may be carrying or wearing a mobile electronic device having a mobile proximity detector. In some cases, the biker 702 may use the mobile proximity detector as described with reference to FIG. 6, to determine a likelihood of close contact with another biker 704, 706, 708, jogger 710, walker, driver, or their device. In some cases, the biker 702 may additionally or alternatively use the mobile proximity detector to track the positions of the people they know (e.g., the second biker 704 or other known bikers 706, 708).

To track the second biker 704, the first biker 702 may place their mobile proximity detector in a tracking mode and select the second biker 704 (or second user). In some cases, the second biker 704 may be identified within a list of contacts. In some cases, the second biker 704 may be identified by inputting, for example, the second biker's name, telephone number, and/or other information. A device that the second biker 704 may be carrying or wearing may then be identified using an association between the identity of the second biker 704 and the second biker's device, which association may be stored on the first biker's mobile electronic device or retrieved by the first biker's mobile electronic device.

After the first biker 702 has identified the second biker 704 to the mobile proximity detector, the mobile proximity detector may track the second biker 704 and, for example, determine when the second biker 704 is becoming more distant from the first biker 702 (e.g., lagging behind or pulling ahead), is slowing down relative to the first biker 702, is stopped, or has changed paths. A notification manager of the first biker's mobile electronic device may then notify the first biker 702 of the second biker's lagging behind, pulling ahead, or stopping. In some cases, the second biker 704 may be identified by name or other identifier assigned by the first biker.

Figure 8:
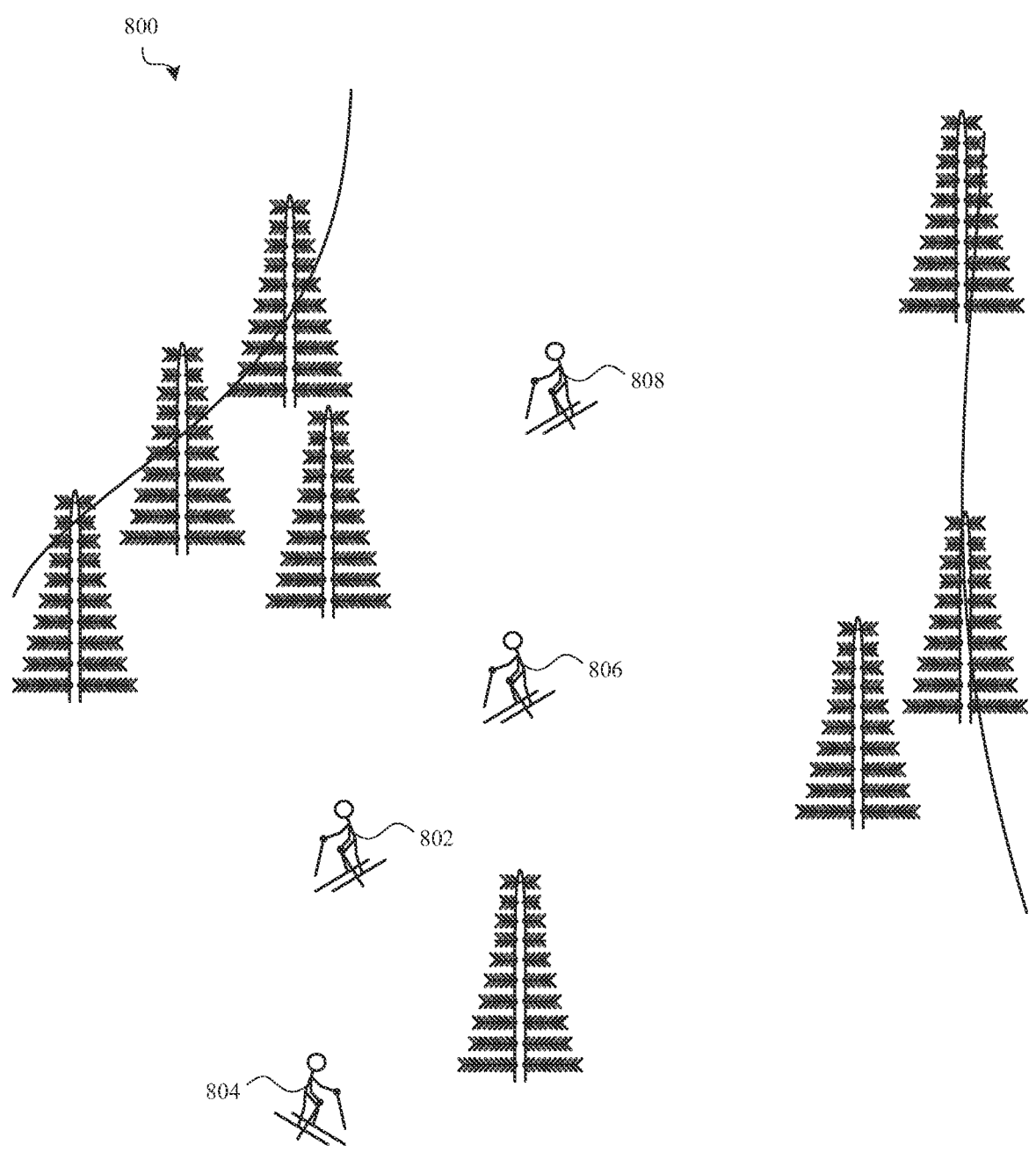
FIG. 8 shows a third example use of a mobile electronic device having a mobile proximity detector, by a skier on a ski slope.

FIG. 8 shows a third example use of a mobile electronic device having a mobile proximity detector, by a skier 802 on a ski slope 800. The skier 802 may be a first skier, who may be skiing with a second skier 804 (and possibly other skiers) they know. Other skiers 806, 808 may also be skiing on the ski slope 800. Alternatively, and by way of example, the scenario described with reference to FIG. 8 could be altered to be a motocross track, a sand dune, a lake, or other setting, and the skiers could instead be motorcyclists, dirt bike riders, all-terrain vehicle (ATV) operators, or boaters.

The skier 802 may be carrying or wearing a mobile electronic device having a mobile proximity detector. In some cases, the skier 802 may use the mobile proximity detector as described with reference to FIG. 6, to determine a likelihood of close contact with another skier (e.g., skier 804, 806, or 808) or their device. In some cases, the skier 802 may additionally or alternatively use the mobile proximity detector to track the positions of the people they know (e.g., the second skier 804).

To track the second skier 804, the first skier 802 may place their mobile proximity detector in a race mode and select the second skier 804 (or second user). In some cases, the second skier 804 may be identified within a list of contacts. In some cases, the second skier 804 may be identified by inputting, for example, the second skier's name, telephone number, and/or other information. A device that the second skier 804 may be carrying or wearing may then be identified using an association between the identity of the second skier 804 and the second skier's device, which association may be stored on the first skier's mobile electronic device or retrieved by the first skier's mobile electronic device. In some cases, the first skier 802 may select a notification interval at which updates on the second skier's proximity will be provided.

After the first skier 802 has identified the second skier 804 to the mobile proximity detector, the mobile proximity detector may track the second skier 804 and, for example, determine whether the first skier 802 or the second skier 804 is ahead or behind on the ski slope 800, and by how much (in either distance or time). The mobile proximity detector may also determine if the second skier 804 has stopped or had a sudden decrease in their speed. A notification manager of the first skier's mobile electronic device may then notify the first skier 802 of the second skier's position, time behind, time ahead, etc. In some cases, the second skier 804 may be identified by name or other identifier assigned by the first skier 802.

Figure 9:
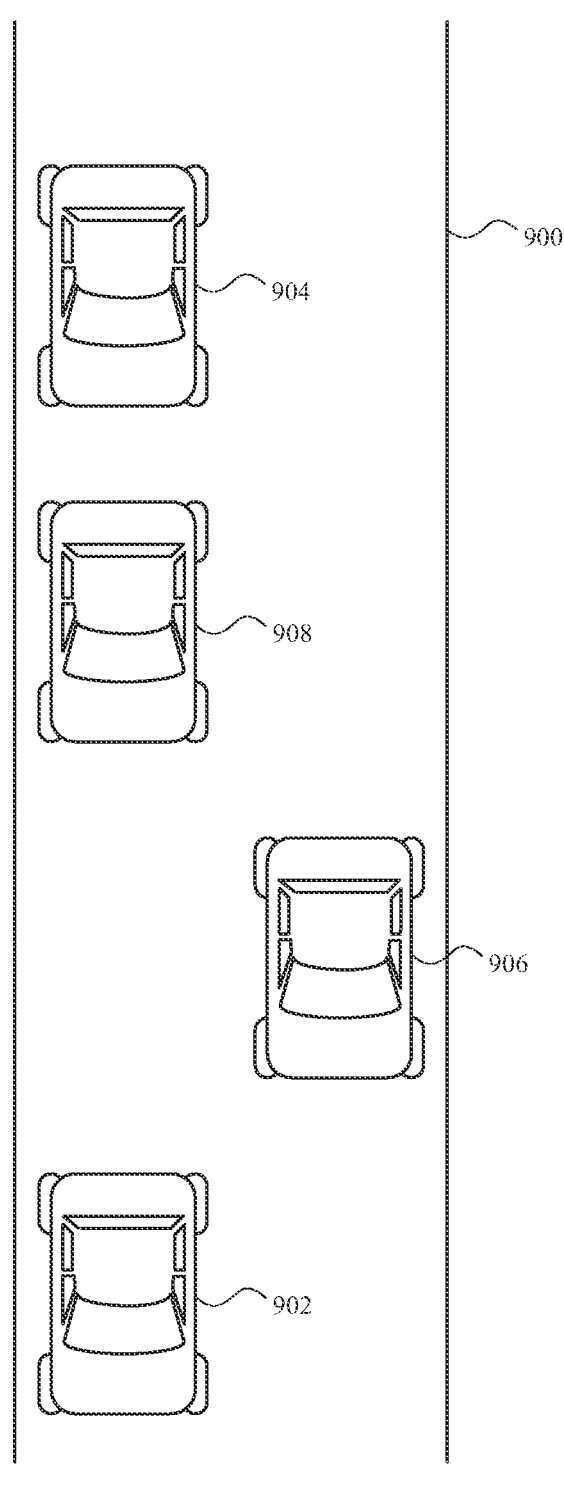
FIG. 9 shows a fourth example use of a mobile electronic device having a mobile proximity detector, by a driver of a vehicle on a road.

FIG. 9 shows a fourth example use of a mobile electronic device having a mobile proximity detector, by a driver of a vehicle 902 on a road 900. The driver may be a first driver of a first vehicle 902, who is traveling with a second driver of a second vehicle 904. Other drivers of other vehicles 906, 908 may also be traveling on the road.

The driver may be carrying or wearing a mobile electronic device having a mobile proximity detector, or the driver may be driving a vehicle 902 that is carrying the mobile electronic device or a vehicle 902 in which the mobile electronic device is installed. In some cases, the driver of the first vehicle 902 may use the mobile proximity detector as described with reference to FIG. 6, to determine a likelihood of close contact with another driver or their device. In some cases, the driver may additionally or alternatively use the mobile proximity detector to track the positions of vehicles that they are traveling with (e.g., the second vehicle 904).

To track the second vehicle 904, the first driver may place their mobile proximity detector in a tracking mode (or road trip mode) and select the second vehicle 904 (or a driver or passenger of the second vehicle 904). In some cases, a driver or passenger of the second vehicle 904 may be identified within a list of contacts. In some cases, a driver or passenger of the second vehicle 904 may be identified by inputting, for example, the driver's or passenger's name, telephone number, and/or other information. Alternatively, the second vehicle 904 may be identified to the mobile proximity detector (e.g., when the mobile proximity detector tracks the second vehicle 904). A device that the driver or passenger of the second vehicle 904 may be carrying or wearing, or that may be installed in or carried by the second vehicle 904, may then be identified using an association between the identity of the driver or passenger of the second vehicle 904 and the driver's or passenger's device, which association may be stored on the first driver's mobile electronic device or retrieved by the first driver's mobile electronic device.

After the first driver has identified the driver or passenger of the second vehicle 904 (or the second vehicle 904) to the mobile proximity detector, the mobile proximity detector may track the second vehicle 904 and, for example, determine when the second vehicle 904 is becoming more distant from the first vehicle 902 (e.g., lagging behind or pulling ahead), is slowing down relative to the first vehicle 902, is stopped, or has made a detour. A notification manager of the first driver's mobile electronic device may then notify the first driver of the second vehicle's lagging behind, pulling ahead, or stopping. In some cases, the driver or passenger of the second vehicle 904 (or the second vehicle 904) may be identified by name or other identifier assigned by the first driver.

Although each of the scenarios described with reference to FIGS. 6-9 illustrate how a mobile proximity detector may be used to determine a likelihood of close contact with a single remote device or user, a mobile proximity detector can be used to determine a likelihood of close contact with each of multiple remote devices or their users.

Although various example use cases for a mobile proximity detector are described in detail with reference to FIGS. 6-9, other use cases also exist. For example, a person walking or running across a street, or walking or running near a street, may be carrying or wearing a mobile device having a mobile proximity detector, and the mobile proximity detector may receive a sequence of remote device proximity indicators from one or more remote devices that are carried or installed in nearby vehicles. The walker may receive a notification of a likelihood of close contact with the remote device when the remote device is getting too close or approaching too fast, as determined by mobile proximity detector. In some cases, the likelihood of close contact, or the determination that the remote device is getting too close or approaching too fast, may be determined in the context of map data. For example, a likelihood of close contact may be determined to exist if the person is on a sidewalk or street, but not if the person is in a building but near the sidewalk or street. Map data may also be used by the mobile proximity detector to determine whether the remote device is approaching too fast given the proximity of a stop light (e.g., a red light) or a stop sign, or given a determination that the remote device is in a turn lane or otherwise may be forced to turn. For example, if the remote device is in a turn lane, it may be assumed that the path of the remote device will soon change direction. It may also be determined whether the remote device is going too fast in the turn lane and therefore might not make the turn (or might not make the turn successfully). In some cases, the walker or runner described in this paragraph could alternatively be a drive of another vehicle.

Figure 10:
FIG. 10 shows an example user interface of a mobile electronic device that includes a mobile proximity detector as described herein.
Figure 10:
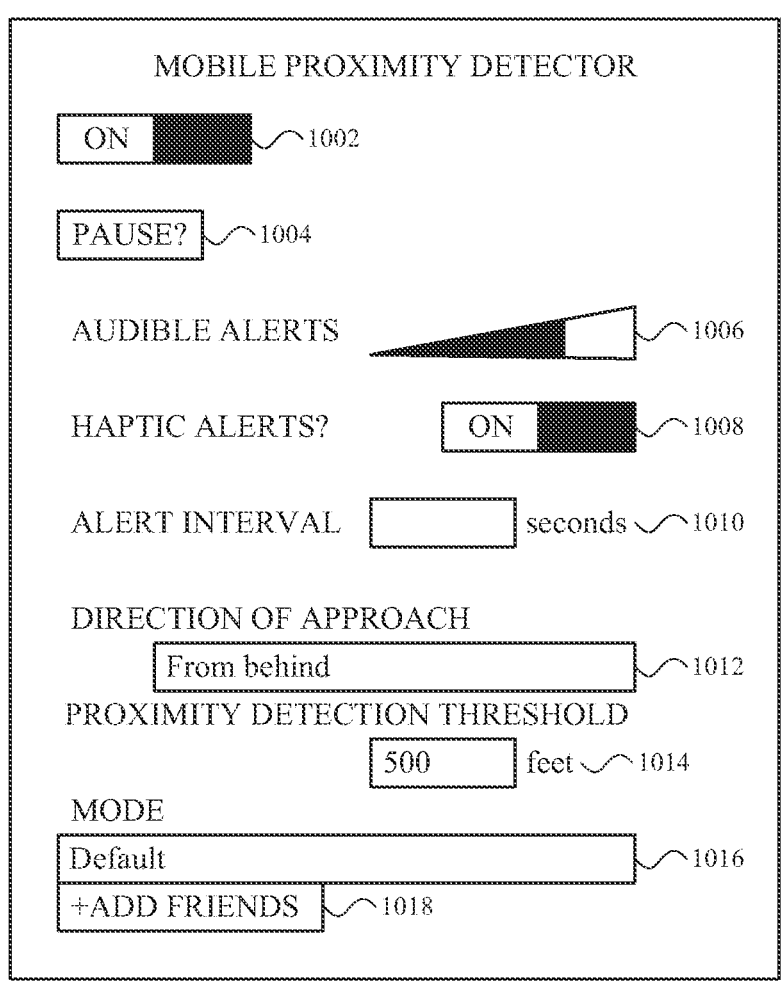

FIG. 10 shows an example user interface 1000 of a mobile electronic device that includes a mobile proximity detector as described herein. Although the user interface 1000 is shown to include only a single page of information, the information may alternatively be displayed across multiple pages of information (e.g., in a sequence of pages). Also, the information is only an example of information that may be displayed, and a mobile electronic device may alternatively display other or different information. As shown, the user interface 1000 may display various selection prompts for configuring the mobile proximity detector.

A first prompt 1002 enables a user to turn the mobile proximity detector ON or OFF, so that a user is not overwhelmed with notifications when the user is paying attention to their surroundings, not moving, or otherwise not interested in receiving proximity notifications.

A second prompt 1004 enables a user to pause or un-pause operation of the mobile proximity detector. A user may want to pause operation, for example, while walking through a large crowd, while walking on a busy street or under a busy overpass, while on a congested portion of a trail, or while driving in rush hour traffic.

A third prompt 1006 enables a user to select an audible notification volume. A user may desire to reduce the notification volume so that notifications on a busy trail do not interfere with their enjoyment of music. Alternatively, a user may desire to increase the notification volume, so as to ensure that notifications are not missed. Regardless of the volume selected, the notification volume may in some cases be configured to increase as a likelihood of close contact with a remote device or its user increases. Other automatic volume adjustments may also be made by a notification manager (e.g., notifications may be configured to have a lower volume when many remote devices are detected proximate to the user, or when the frequency of remote devices entering the user's proximity is steady).

A fourth prompt 1008 enables a user to switch to haptic notifications (e.g., vibrations). Alternatively, the fourth prompt 1008 may enable a user to add haptic notifications. In some cases, the fourth prompt 1008 may be a collection of prompts that enables a user to activate or deactivate multiple types of notifications and/or set different notification types (or combinations of notification types) for different likelihoods of close contact, times of close contact, and so on. The collection of prompts may also enable a user to configure properties of a notification, such as a volume, intensity, or force of the notification.

A fifth prompt 1010 enables a user to configure notification timings. The fifth prompt 1010 may include options to specify, for example, a time interval between notifications or whether a device's notification manager may automatically determine the time interval(s).

A sixth prompt 1012 enables a user to specify the direction(s) of approach for which notifications are provided. For example, the user may select "only from behind," "only from behind or to the side," "outside expected range of peripheral vision," or "from all directions."

A seventh prompt 1014 enables a user to configure a proximity detection threshold. The proximity detection threshold prevents the user from being notified of a likelihood of close contact or other proximity-related information until a remote device enters the configured proximity detection threshold.

An eighth prompt 1016 enables a user to place the mobile proximity detector in one of a number of modes, including, for example, a "default" mode, a "tracking" mode, a "race" mode, or a "road trip" mode, as described elsewhere herein.

A ninth prompt 1018 may appear when the "tracking" mode, "race" mode, or "road trip" mode has been selected, and may enable a user to add friends to a group of other users to be tracked, to be included in race updates, or to be included in a road trip, as described elsewhere herein.

FIG. 11 shows an example method 1100 of notifying a user of a mobile electronic device of a likelihood of close contact between the user and a remote device.

At block 1102, the method 1100 includes wirelessly receiving, from the user of the mobile electronic device and at the mobile electronic device, a request to activate a mobile proximity detector on the mobile electronic device. For example, the user may turn the mobile proximity detector ON or un-pause the mobile proximity detector, as described with reference to FIG. 10.

At block 1104, the method 1100 may include receiving, at the mobile electronic device and from the remote device, a sequence of remote device proximity indicators.

At block 1106, the method 1100 may include monitoring, using the mobile proximity detector, a current position and a current velocity (or heading and speed) of the mobile electronic device.

At block 1108, the method 1100 may include determining, using the mobile proximity detector and the sequence of remote device proximity indicators, a current remote device position and a current remote device velocity (or heading and speed).

At block 1110, the method 1100 may optionally include determining the current remote device position is on a first path, and determining the current position of the mobile electronic device is on a second path.

At block 1112, the method 1100 may include determining, using the mobile proximity detector and at least the current remote device position, the current remote device velocity, and the current position and the current velocity of the mobile electronic device, the likelihood of close contact between the user and the remote device. When first and second paths are identified at block 1110, the likelihood of close contact may be further determined using a map of the first and second paths.

At block 1114, the method 1100 may include notifying the user of the likelihood of close contact.

In some cases, the method 1100 may include determining, using the mobile proximity detector, that the first and second paths are a same path or intersecting paths. In these cases, the likelihood of close contact between the user and the remote device may be further determined based on the first and second paths being the same path or intersecting paths. Path information (e.g., a map of the first and second paths, and knowledge that the positions of the mobile electronic device and remote device are on the same path or intersecting paths, may enable the mobile proximity detector to determine with more certainty whether a likelihood of close contact exists.

When path information is available, the method 1100 may also include determining, using the mobile proximity detector and at least the current remote device position, the current remote device velocity, the current position and the current velocity of the mobile electronic device, and a map of the first and second paths, which of the mobile electronic device or the remote device is ahead of the other (that is, assuming that the devices are headed in the same general direction along a path or paths).

In some cases, the method 1100 may include receiving, from the user (a first user) and at the mobile proximity detector, an identity of a second user. In these cases, the method 1100 may also include identifying the remote device using an association between the second user and the remote device, which association may be stored on the mobile electronic device of the first user or retrieved by the mobile electronic device of the first user.

In some cases, the method 1100 may include determining, using at least the current remote device position and the current position and the current velocity of the mobile electronic device, that the remote device is behind the user of the mobile electronic device. In these cases, the user may be notified of the likelihood of close contact in response to the determination that the remote device is behind the user (e.g., the user may only be notified when the remote device is determined to be behind the user). Alternatively, the user may only be notified when the remote device is behind or to the side of the user or, alternatively, when the remote device is outside an expected range of peripheral vision of the user.

Other examples and implementations are within the scope and spirit of the disclosure and appended claims. For example, features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C). Further, the term "exemplary" does not mean that the described example is preferred or better than other examples.

The foregoing description, for purposes of explanation, uses specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. A mobile electronic device, comprising:
a non-transitory storage medium storing instructions; and
    a processor that executes the instructions to:
receive, from a remote device and via short-range wireless communications, a sequence of remote device proximity indicators in a sequence of beamformed communications;
monitor a current position and a current velocity of the mobile electronic device;
determine directions of reception for beamformed communications in the sequence of beamformed communications;
determine signal strengths for the beamformed communications in the sequence of beamformed communications;
determine a current remote device position using at least a determined direction of reception and a determined signal strength for at least one beamformed communication in the sequence of beamformed communications;

determine a current remote device velocity using at least a determined direction of reception and a determined signal strength for at least one beamformed communication in the sequence of beamformed communications and using the sequence of remote device proximity indicators;
determine, using at least the current remote device position, the current remote device velocity, and the current position and the current velocity of the mobile electronic device, a likelihood of close contact between the mobile electronic device and the remote device; and
provide the likelihood of close contact.

2. The mobile electronic device of claim 1, wherein the processor: determines the current remote device position is on a first path;
determines the current position of the mobile electronic device is on a second path; and further determines the likelihood of close contact between the mobile electronic device
and the remote device using a map of the first path and the second path.

3. The mobile electronic device of claim 1, wherein the processor further determines the current remote device position using the sequence of remote device proximity indicators.

4. The mobile electronic device of claim 1, wherein the processor
determines a time of close contact between the mobile electronic device and the remote device; and
provides the time of close contact.

5. The mobile electronic device of claim 4, wherein the processor changes, in response to a change in the time of close contact, a property or type of notification used to provide the time of close contact.

6. The mobile electronic device of claim 1, wherein the processor determines, using at least the determined current remote device position, the current remote device velocity, and the current position and the current velocity of the mobile electronic device, a direction of approach of the remote device with respect to the mobile electronic device.

7. The mobile electronic device of claim 6, wherein the processor provides the direction of approach of the remote device.

8. The mobile electronic device of claim 7, wherein the processor:
determines a time of close contact between the mobile electronic device and the remote device; and
provides the time of close contact, along with the direction of approach of the remote device.

9. The mobile electronic device of claim 1, wherein the sequence of remote device proximity indicators includes a sequence of positions of the remote device.

10. A method, comprising:
receiving, at a mobile electronic device and from a remote device via short-range wireless communications, a sequence of remote device proximity indicators in a sequence of beamformed communications;
monitoring a current position and a current velocity of the mobile electronic device; determining directions of reception for beamformed communications in the sequence of beamformed communications;
determining signal strengths for the beamformed communications in the sequence of beamformed communications;
determining a current remote device position using at least a determined direction of reception and a determined signal strength for at least one beamformed communication in the sequence of beamformed communications;

determining a current remote device velocity using at least a determined direction of reception and a determined signal strength for at least one beamformed communication in the sequence of beamformed communications and using the sequence of remote device proximity indicators;

determining, using at least the current remote device position, the current remote device velocity, and the current position and the current velocity of the mobile electronic device, a likelihood of close contact between the mobile electronic device and the remote device; and providing the likelihood of close contact.

11. The method of claim 10, wherein determining the current remote device position uses the sequence of remote device proximity indicators and the determined direction of reception and the determined signal strength.

12. The method of claim 10, wherein the processor:

determines paths of the mobile electronic device and the remote device; and further determines the likelihood of close contact using the paths.

13. The method of claim 12, wherein the processor determines whether the paths are intersecting paths.

14. The method of claim 12, wherein the processor determines whether the paths are a same path.

15. The method of claim 14, wherein the processor determines relative positions of the mobile electronic device and the remote device on the same path.

16. A non-transitory computer storage medium having programming instructions stored thereon that, when executed by one or more processors of a mobile electronic device, cause the mobile electronic device to perform operations comprising:

receiving, at the mobile electronic device and from a remote device via short-range wireless communications, a sequence of remote device proximity indicators in a sequence of beamformed communications;

monitoring a current position and a current velocity of the mobile electronic device;

determining directions of reception for beamformed communications in the sequence of beamformed communications;

determining signal strengths for the beamformed communications in the sequence of beamformed communications;

determining a current remote device position using at least a determined direction of reception and a determined signal strength for at least one beamformed communication in the sequence of beamformed communications;

determining a current remote device velocity using at least a determined direction of reception and a determined signal strength for at least one beamformed communication in the sequence of beamformed communications and using the sequence of remote device proximity indicators;

determining, using at least the current remote device position, the current remote device velocity, and the current position and the current velocity of the mobile electronic device, a likelihood of close contact between the mobile electronic device and the remote device; and providing the likelihood of close contact.

17. The non-transitory computer storage medium of claim 16, wherein determining the current remote device position uses the sequence of remote device proximity indicators and the determined direction of reception and the determined signal strength.

18. The non-transitory computer storage medium of claim 16, wherein the operations further comprise:

determining paths of the mobile electronic device and the remote device; and determining the likelihood of close contact using the paths.

* * * * *